United States Patent
Scott

(10) Patent No.: US 9,458,782 B2
(45) Date of Patent: Oct. 4, 2016

(54) SELECTIVE CATALYST REDUCTION HEAT MANAGEMENT METHOD AND SYSTEM

(71) Applicant: Komatsu America Corp., Rolling Meadows, IL (US)

(72) Inventor: David J. Scott, Washington, IL (US)

(73) Assignee: Komatsu America Corp., Rolling Meadows, IL (US)

( * ) Notice: Subject to any disclaimer, the term of this patent is extended or adjusted under 35 U.S.C. 154(b) by 344 days.

(21) Appl. No.: 14/247,743

(22) Filed: Apr. 8, 2014

(65) Prior Publication Data

US 2015/0285174 A1 Oct. 8, 2015

(51) Int. Cl.
*F01N 3/00* (2006.01)
*F02D 41/02* (2006.01)
*F01N 3/20* (2006.01)

(52) U.S. Cl.
CPC ......... *F02D 41/0245* (2013.01); *F01N 3/2066* (2013.01); *F02D 41/021* (2013.01); *F02D 2041/026* (2013.01); *Y02T 10/26* (2013.01)

(58) Field of Classification Search
CPC .................................................. F02D 41/021
USPC ......................................................... 60/300
See application file for complete search history.

(56) References Cited

U.S. PATENT DOCUMENTS

| | | | | |
|---|---|---|---|---|
| 5,832,400 A * | 11/1998 | Takahashi | ............ | B60K 31/00 701/53 |
| 6,078,859 A * | 6/2000 | Jastrzebski | .......... | B60K 31/047 123/352 |
| 6,470,985 B1 * | 10/2002 | Inada | ...................... | B60K 6/46 180/309 |
| 7,278,503 B1 * | 10/2007 | Kato | .................... | B60K 17/02 180/65.1 |
| 2010/0043402 A1 * | 2/2010 | Perry | ................. | F02D 41/0235 60/285 |
| 2010/0122523 A1 | 5/2010 | Vosz | | |
| 2013/0197775 A1 * | 8/2013 | Szwabowski | ....... | F02D 41/0002 701/101 |
| 2014/0013726 A1 * | 1/2014 | Yacoub | ................... | F01N 3/32 60/274 |

FOREIGN PATENT DOCUMENTS

| | | |
|---|---|---|
| DE | 10 2008 025 569 A1 | 12/2009 |
| DE | 10 2009 052 713 A1 | 6/2010 |

OTHER PUBLICATIONS

Office Action issued Jan. 13, 2016 in German Application No. DE 10 2015 003 839.7, 12 pages, German Language.

* cited by examiner

*Primary Examiner* — Audrey K Bradley
*Assistant Examiner* — Anthony Ayala Delgado
(74) *Attorney, Agent, or Firm* — Brinks Gilson & Lione

(57) ABSTRACT

The heat provided to a vehicle based SCR system may be managed by purposely increasing the load placed on the vehicle's engine such that the engine's exhaust gas temperature remains above a predetermined level. The energy generated by the extra load placed on the engine may be dissipated through an energy absorption device. The need for extra engine load may be anticipated to ensure adequate heat is provided to the SCR throughout various operating conditions.

17 Claims, 8 Drawing Sheets

SELECTIVE CATALYST REDUCTION HEAT MANAGEMENT METHOD AND SYSTEM

BACKGROUND

1. Technical Field Text

The invention relates to vehicular selective catalyst reduction systems. In particular, the invention relates to managing the heat provided to the selective catalyst reduction system in a vehicle.

2. Background Information

Emission control for engines burning carbon based fuel is of great interest. Such interest exists for emission control for diesel compression piston engines commonly installed in off-highway earth moving equipment, for example an off-highway mining dump truck. Study of emission control has increased as many government agencies have issued deadlines for implementing emission control solutions that comply with guidelines. One solution under implementation by engine and equipment manufacturers is the use of selective catalyst reduction (hereinafter "SCR"). A subset group of SCR systems uses a liquid urea solution known as diesel exhaust fluid to support the catalytic reaction. The performance of the catalytic reaction within SCR systems is very heat dependent, requiring certain components of the SCR system to remain within specific temperature ranges that will allow the components of the SCR system to perform the catalytic reaction effectively. As the diesel exhaust fluid is injected in dosed measurement amounts, its proper function is highly dependent on subsequent heat available in the exhaust gases flowing to the catalyst components in the system.

Malfunction and poor reaction efficiency of SCR systems and components occurs when the heat provided by exhaust gases of the engine are insufficient for supporting the SCR system catalytic reaction process. SCR system components, such as valves, nozzles, injectors, and agents, may cease to function properly if the exhaust gas heat is insufficient. These low temperatures in turn also contribute to reduction of the functional life of certain components in the SCR system. Providing sufficient temperatures within the SCR system is normally met under the conditions of a working loaded engine due to the relatively high fuel usage rate in relation to the range of fuel usage rate for the specific engine. However, there exist time periods where idle or minimal engine power output are required for the vehicle operating condition. These time periods of minimal engine power provide conditions where low fuel usage rates exist, which in turn results in insufficient heat for acceptable SCR system operation. The insufficiency of heat increases as ambient temperatures decrease. Therefore, there is a need for a method and system to manage the heat provided to SCR systems.

SUMMARY

According to one embodiment, a method for providing adequate heat to a selective catalyst reduction system located in a vehicle with an engine and a selective catalyst reducer (SCR) may include the steps of sensing a temperature indicative of the gas temperature at the inlet of the SCR, determining whether the gas temperature at the inlet of the SCR is at a predetermined minimum temperature, determining the engine load required for current vehicle operation, calculating an increased engine load required to increase the gas temperature at the inlet of the SCR to at least the predetermined minimum temperature, calculating an excess engine load by comparing the engine load required for current vehicle operation to the increased engine load, adjusting the engine load to the increased engine load, discarding the excess engine load through a power absorption device.

According to another embodiment, a selective catalyst reduction heat management system located in a vehicle with an engine may include a sensor configured to determine a temperature indicative of the gas temperature at the inlet of a selective catalyst reducer (SCR), an SCR controller in communication with the sensor. The SCR controller may be configured to determine whether the gas temperature at the inlet of the SCR is at a predetermined minimum temperature and calculate an increased engine load required to increase the gas temperature at the inlet of the SCR to at least the predetermined minimum temperature. The system may also include a drive system controller in communication with the SCR controller, where the drive system controller is configured to determine an engine load required for current vehicle operation, calculate an excess engine load by comparing the engine load required for current vehicle operation to the increased engine load, and adjust the engine load to the increased engine load. The system may also include a power absorption device in communication with the drive system controller and connected to the engine, where the power absorber device is configured to discard the excess engine load.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The embodiments described below may be more fully understood by reading the following description in conjunction with the drawings, in which.

DETAILED DESCRIPTION OF THE DRAWINGS AND THE PRESENTLY PREFERRED EMBODIMENTS

Figure 1:
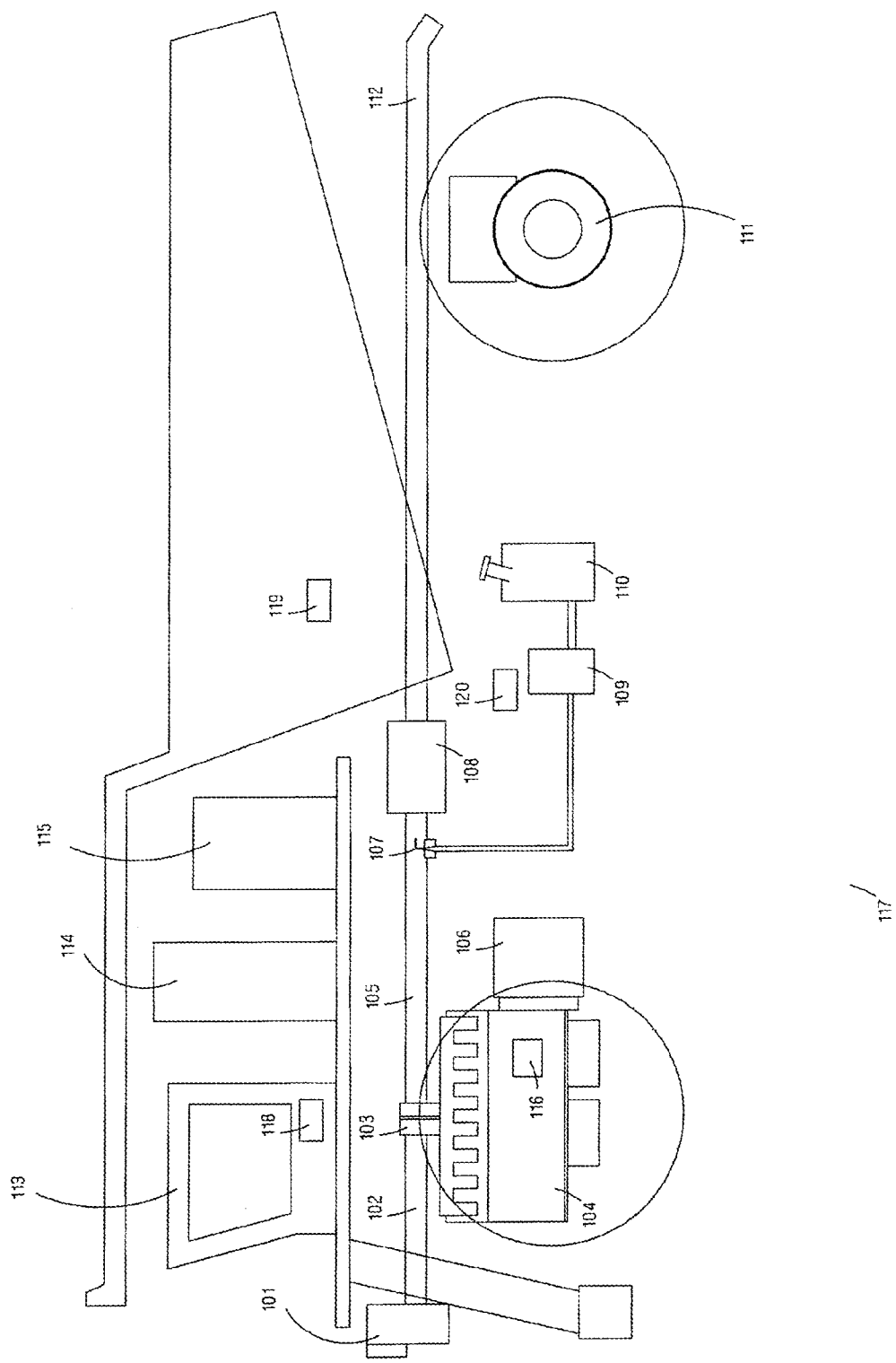
FIG. 1 is a diagram of a vehicle with an SCR system according to one embodiment.

FIG. 1 illustrates a diagram of a vehicle with an SCR system according to one embodiment. The vehicle 117 may be an off-highway electric drive powered dump truck. The vehicle 117 includes a fuel burning engine 104 which provides rotational shaft power to an electrical generation device 106, which in turn provides electrical energy through drive system controls 114. The drive system controls 114 direct the electrical energy to the wheel traction motor or motors 111 for propulsion.

When the vehicle 117 is operated in conditions where retarding forces are required, such as downhill operations, rotational energy may be extracted from the wheel traction motor or motors 111 electrically through the drive system controls 114. The extracted electrical energy may be discharged to the ambient air through the drive system component retarding grid 115.

The engine 104 may include air intake filter or filters 101. The air intake filter or filters 101 provide intake air to an air charging system 103 through air intake piping systems 102. Intake air is supplied to the engine 104 through air charging system 103.

The engine 104 exhausts heated gasses through exhaust piping 105. Exhaust piping 105 contains an SCR system with diesel exhaust fluid injection valves 107 and SCR catalyst gas flow vessel 108. SCR catalyst gas flow vessel 108 exhausts the finalized SCR system treated gasses through exhaust piping 112.

The SCR system may consist of components including a diesel exhaust fluid supply reservoir or reservoirs 110 which supplies diesel exhaust fluid using a controller and valve system 109 to the SCR system diesel exhaust fluid injection valve or valves 107. The controller and valve system 109 may be separate components with many combinations of various system implementations. The controller and valve system 109 may also include portions incorporated into the engine controls 116, vehicle controls 118, and other controls, with many combinations of various system implementations.

Specific action by the operator in the operator controls station 113 may provide commands which could be mechanical, electrical, radio wave, or other transmitted means. The commands may command the vehicle systems, such as the drive system controls 114, engine controls 116, and other systems controls on the vehicle, whether directly or through drive system controls 114 and or possible other systems of controls.

Figure 5:
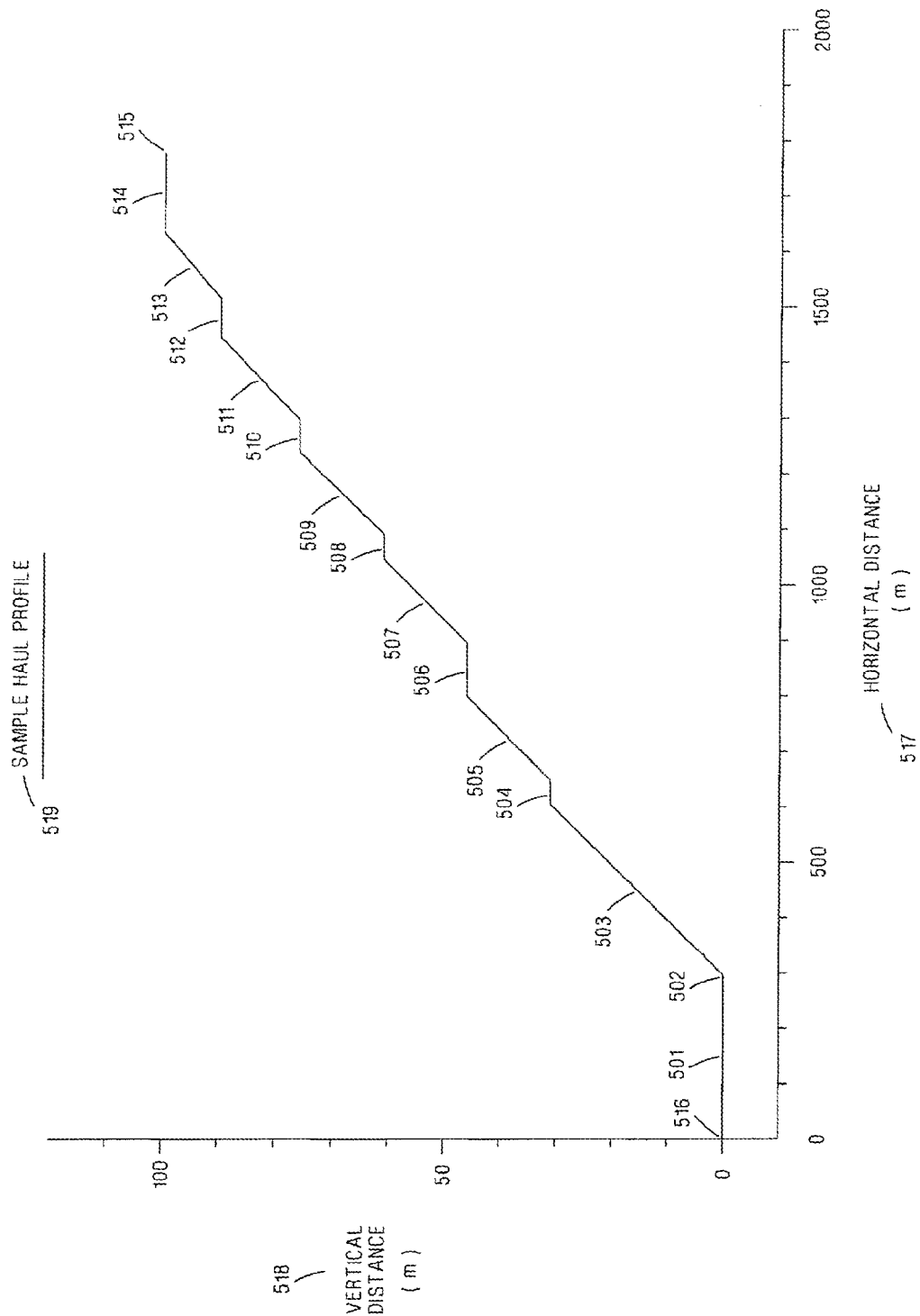
FIG. 5 is a graphical representation of a haul profile according to one embodiment.

Operating conditions of an exemplary application of vehicle 117 as an off-highway mining dump truck may be shown in FIG. 5, which is a graphical representation of a haul profile according to one embodiment. The sample haul profile 519 begins with vehicle 117 at an earth material loading shovel having been fully loaded and ready to begin movement 516. The vehicle 117 then maneuvers through a level segment 501 from the loading shovel area to begin its path upward at the start portion of the haulage road 502. Haulage road 502 may have ascending segments 503, 505, 507, 509, 511, 513 and short flat sections 504, 506, 508, 510, 512 in the haul profile route. Then, in turn, the vehicle 117 may encounter relatively level terrain dumping area segment 514. At the end 515 of the profile 519 the load is ejected, such as in a dumping operation. The vehicle 117 then returns via the same profile in the return direction descending back to the earth material loading shovel to again be at the start position 516. This round trip type of application, in this case ascending loaded haulage and descending empty return, is an example of a haul cycle.

Figure 4:
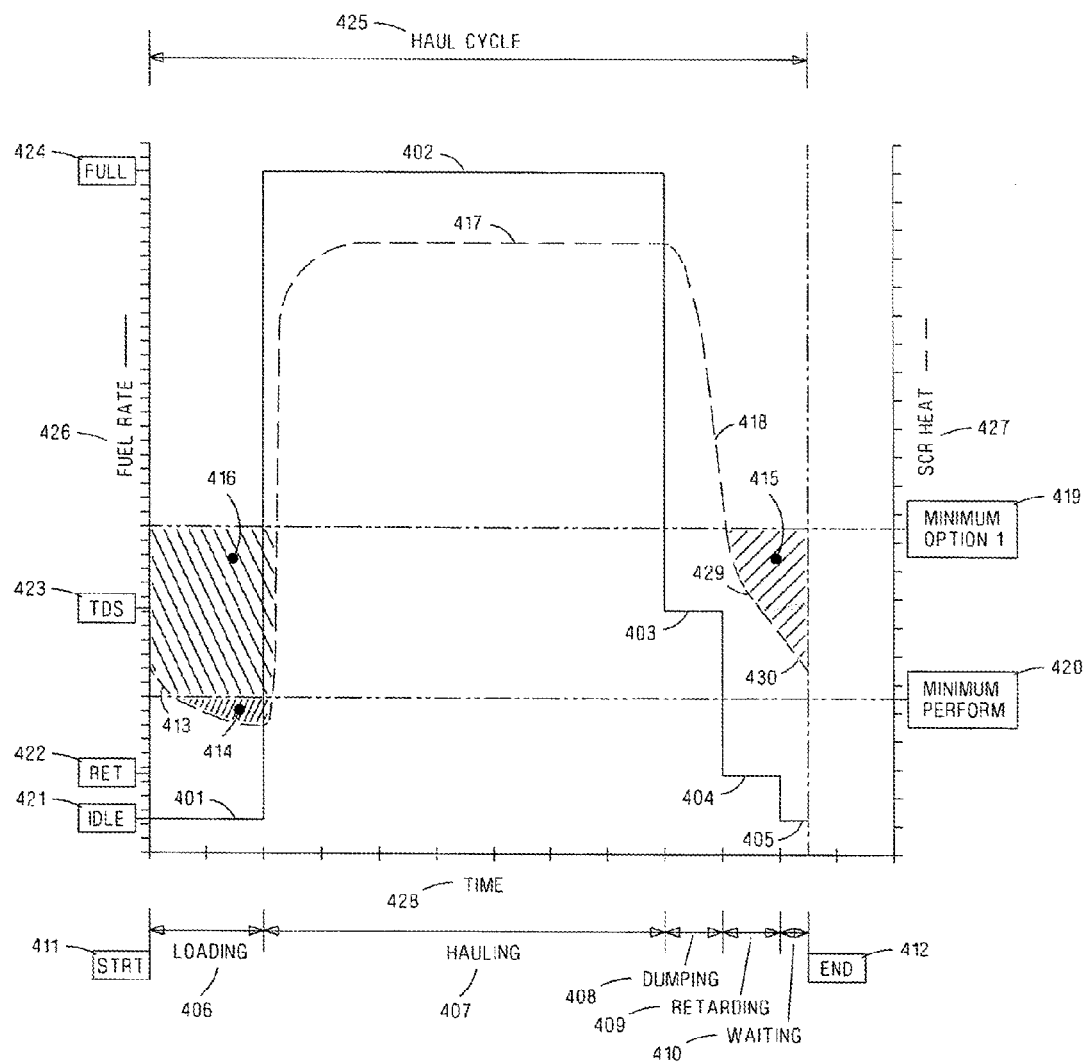
FIG. 4 is a graphical representation of haul cycle fuel rate and SCR heat according to one embodiment.

Engine operating conditions of example vehicle 117 throughout sample haul profile 519 may be shown in FIG. 4, which is a graphical representation of haul cycle fuel rate and SCR heat according to one embodiment. The time axis 428 depicts a start point 411 and an end point 412 for a given haul cycle 425. Haul cycle 425 has portions for a material loading segment 406, a hauling segment 407, a dumping segment 408, a retarding segment 409, and a waiting queue segment 410. The left vertical axis and legend 426 depicts fuel rate levels for various vehicle conditions, such as idle standing condition 421, retarding condition 422, turning-dumping-spotting maneuvers condition 423, and full rated power level condition 424. The right side vertical axis and legend 427 depicts a temperature curve for heat available to the SCR. The temperature curve 427 includes an idle level 421 resultant temperature segment 413, a full power level 424 resultant temperature segment 417, a maneuvering turning dumping spotting resultant temperature segment 418, a retarding resultant temperature segment 429, and another idle level resultant temperature segment 430. This resultant temperature SCR curve 427 is merely one example resultant temperature curve. Many possible resultant temperature curves may exist and vary for many applications, which will have their own characteristics corresponding to each possible fueling condition. The invention is not to be construed to exclude other possible applications and possible conditions, and combinations thereof.

The haul cycle segment 406, which is the earth material loading segment, has fueling rate segment 401 that results with a decreasing resultant temperatures segment 413, which descends below minimum option 1 level 419 and below a minimum performance level 420. Minimum option 1 level 419 may indicate the level below which the engine does not respond optimally to requested changes in output. Minimum performance level 420 may indicate the level below which the SCR does not perform adequately. Minimum option 1 level 419 and minimum performance level 420 may be predetermined values or may be changed during the haul cycle. The area 414 below minimum performance level 420 and area 416 below minimum option 1 level 419 may occur in this loading region 406 of the haul cycle 425. As the vehicle 117 then proceeds to the hauling segment 407 portion of the haul cycle 425, the resulting temperature heat level 417 may be in the range for acceptable SCR performance. Once reaching the dumping segment 408 of the haul cycle 425, the resultant temperature begins descending in segment 418 and may cross temperature minimum option 1 level 419 at fuel rate TDS 423 in segment 403. Area 415 may depict where resulting temperature has fallen below the minimum option 1 temperature level 419.

When the resultant heat temperatures progress into the region below minimum option 1 level 419, depicted as area 416 and also area 415, the engine's ability to change its power output level, while obtaining efficient SCR reactions, to the maximum fuel rate 424 may be less than optimal or slow and sluggish. Whereas, quicker engine response is provided when the resultant heat temperatures are maintained greater than the minimum option 1 level 419, such as for the material loading segment 406 with corresponding fueling segment 401. Increasing engine rpm, which in turn may increase engine horsepower output slightly, to its maximum governed rpm speed level for many conditions may not provide sufficient improvement to the resultant temperature to reach a satisfied level 419 for a desired amount of non-sluggish engine or vehicle behavior.

In addition to sub-optimal, sluggish performance described above, for conditions where the resultant heat is below the minimum performance level 420 depicted with area 414, the resultant heat temperatures to the SCR system may be insufficient for adequately sustaining the SCR process. Failure to adequately sustain the SCR process may cause detriment to the SCR system components and possibly cause insufficient SCR chemistry reaction. Operating in low heat area 414 may in turn cause a short life of SCR components, contribute to plugging crystallization deposits, cause exhaust gasses to be outside of desired levels of the intended SCR performance, and many other undesired effects which can be readily found with regard to the use of diesel exhaust fluid SCR systems.

Figure 2:
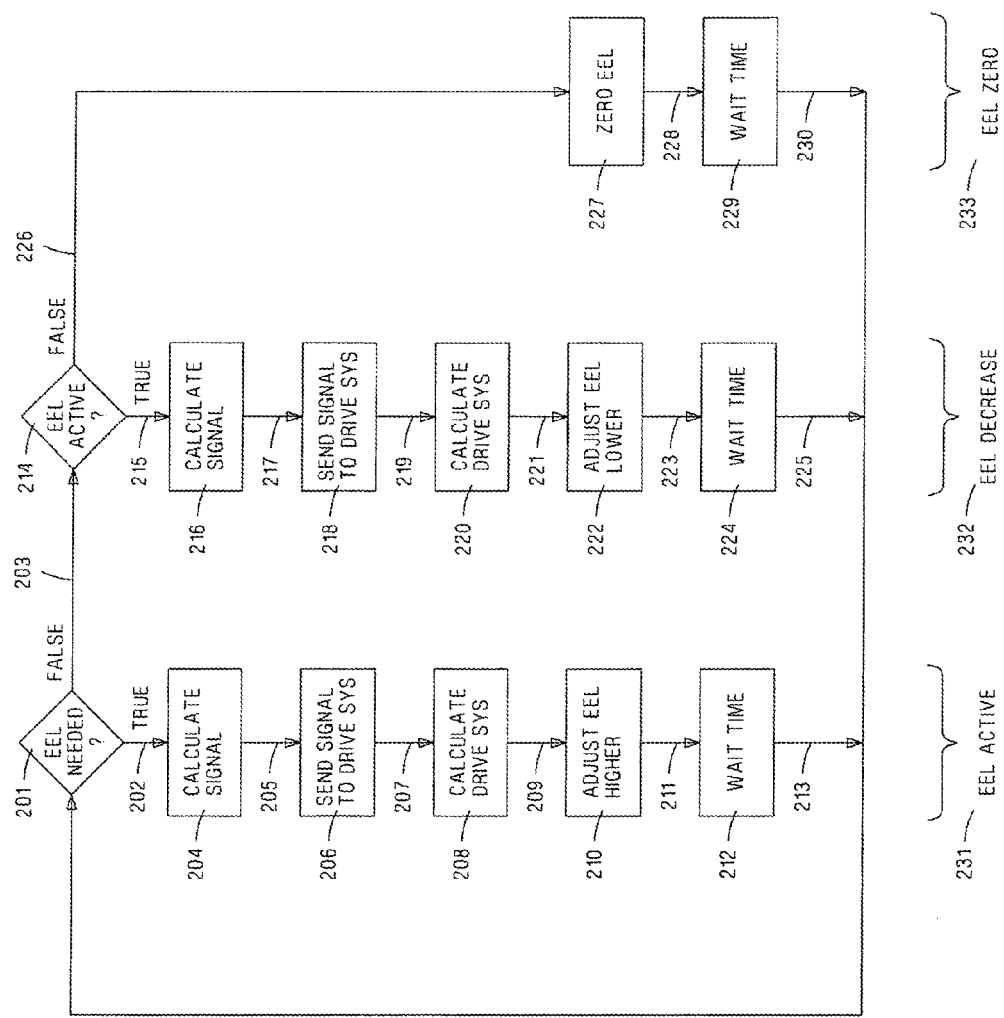
FIG. 2 is a flow diagram of a drive system logic decision tree according to one embodiment.

FIG. 2 is a flow diagram of a drive system logic decision tree according to one embodiment that manages the heat delivered to the SCR system. A component in the embodiment, such as SCR system controller 120, determines the need for extra engine load (hereinafter "EEL") to increase the gas temperature to the SCR. The need for EEL is determined at decision entry point 201, upon which logic path true 202 or logic path false 203 is followed. The logic path true 202 leads to process calculation block 204. Process calculation block 204 calculates one or more signals either directly or indirectly related to a desired EEL output power. The EEL output power would result in engine output that is greater than the existing engine output required for current vehicle operation. In other words, the EEL would be above what is required for current vehicle operation, excluding the need for additional SCR heat. Logic path 205 leads to the next process block 206. Process block 206 sends the one or more signals calculated in calculation block 204 to the drive system controls 114.

The next logic path 207 takes the one or more signals to the process block 208. Process block 208, which may be located in the drive system controls 114, calculates the drive system conditions and parameters for making adjustments to the engine power loading to achieve the desired EEL and balancing for that loading. The calculation yields engine command changes that will result in the desired EEL, as well as calculations for drive system power absorption methods and paths. Both may be calculated simultaneously. Power absorption is required for the engine output amounts that are above the power amounts required for current vehicle operation. Process block 208 may determine the amount of engine load that needs to be absorbed and may also determine the path or paths the energy should take to be absorbed. For example, process block 208 may determine that the energy to be absorbed should be divided equally or unequally among various absorption devices, such as retarder grids, brake systems, electric storage devices, batteries, flywheel systems, hydraulic systems, or any other known system to dissipate energy. Once calculation is performed in process block 208, the next logic path 209 brings the process to block 210 for adjustment of the commands as necessary in order to implement the commands and one or more signals for the desired EEL amount that was calculated in process calculation block 204. The resulting EEL will be higher than previous EEL, which may be zero or above zero. The next logic path 211 brings the process to block 212, where a logic wait period is determined. The wait period affords stability of open loop control for the engine command and drive system command adjustments which are nominally small in value. The next logic path 213 returns to the decision block entry point 201.

Taking the decision block entry point 201 false logic path 203 brings the process to decision block 214 for determining if EEL is already present. True logic path 215 leads to logic path 216 through 224. Logic path 216 through 224 is similar to the logic path as described for blocks 202 through 213, except the process block 222 results in a decreasing EEL situation whereas process block 210 may result in either increasing or decreasing EEL as needed with a non-zero signal as the final result. Process block 222 may decrease the EEL already present in order to minimize the amount of power absorbed, while still meeting the desired SCR heat level or engine responsiveness level.

Taking the decision false logic path 226 leads to process block 227 where the parameters for zero EEL are selected. Logic path 228 leads to to process block 229 for a wait time period for open loop stability, as discussed above. Logic path 230 returns to the decision block entry point 201.

Figure 3:
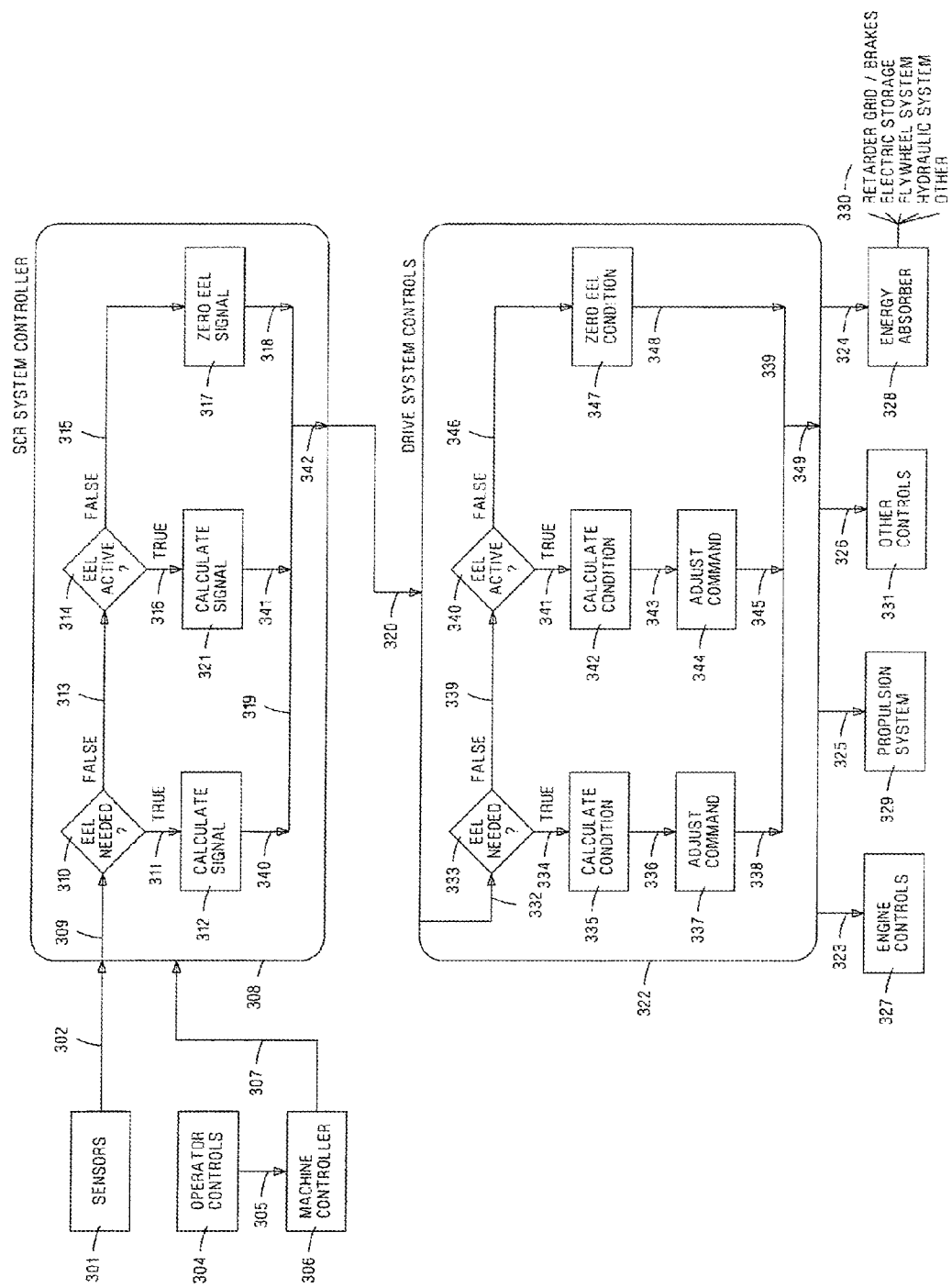
FIG. 3 is a flow diagram of an SCR logic decision tree according to one embodiment.

FIG. 3 is a flow diagram of an SCR logic decision tree according to another embodiment that manages the heat delivered to the SCR system. FIG. 3 includes an SCR system controller 308 for development of the EEL signal 320. FIG. 3 includes sensors 301 that provide input signal 302 to the SCR system controller 308. Sensors 301 may include many parameters, such as engine exhaust system temperatures and flows at various places; engine parameters such as revolution speed, fuel usage level, intake manifold pressure, oil pressure; vehicle condition parameters such as vehicle speed, odometer readings, transmission control settings, brake condition settings; internal or external standard inputs such timers, time storage increments, low voltage power levels; and any other sensors or logics inputs deemed necessary for operation of the SCR system or vehicle 117.

FIG. 3 includes operator cab controls 304, which provide input signals path 305 to a machine controller 306. Machine controller 306 creates one or more signals along path 307 to the SCR system controller 308. As a result of inputs signals 302 and input signals 307, which in turn flow through logic path 309 to decision block 310, a determination of any EEL requirement is made. Taking the resultant false logic path 313 leads to decision block 314, where it is determined whether the EEL command exists at the present state. Taking true logic path 316 leads to operation calculation block 321, where a resulting EEL calculation is provided along output path 319 to exit the SCR system controller 308. Output path 319 leads the EEL signals to path 320 into the drive system controls 322. Taking false logic path 315 leads to decision block 317, which provides for zero EEL along signal path 318 to signal path 320 into the drive system controls 322. Taking the decision true logic path 311 leads to calculation block 312, where the resultant EEL signal is provided along path 319 to exit from the SCR system controller 308 along signal path 320 into the drive system controls 322.

A similar logic is shown as before with the SCR system controller 308 once the signal path 320 reaches the drive system controls 322, except now the input signal or multiple signals along signal path 320 are provided to the drive system controls 322. The drive system controls 322 creates signals and commands along internal logic mechanisms similar to the logic mechanisms in FIG. 2. The resulting one or more signals along signal path 323 that lead to the engine may be adjusted based on the desired EEL. For example, engine controls 327 may increase engine output. The resulting one or more signals along signal path 324 for energy absorption may be adjusted based on the desired EEL. For example, the energy absorber 328 may absorb more or less of the excess energy. The resulting one or more signals along signal path 325 for drive system propulsion actions may be adjusted. For example, the speed of wheel traction motor or motors 111 may be increased or decreased. The resulting one or more signals along signal path 326 for any number of other devices and controls 331, which have input signals from the drive system controls 322, may be adjusted so as to obtain the engine loading required. This is just an example embodiment for which any number or absence of number of signals may exist along any of the signal paths, namely signal path 326, signal path 325, signal path 324 and signal path 323, in this example. The resulting engine loading created by the drive system control signals may utilize varying different signals combinations for each vehicle application.

The drive system controls 322 may receive the one or more signals from signal path 320, which leads to signal path 332 to decision block 333. Taking the resultant true path 334 from decision block 333 leads to operation calculation block 335. Operation calculation block 335 calculates parameters to achieve the desired EEL, where the resultant signals are issued along path 336 to operation block 337. Operation block 337 adjusts signals, as necessary to achieve the desired EEL. The resulting signals proceed along path 338 to path 339, from which any number of resultant signals are delivered to various vehicle components and system. Such signals may include engine signals along path 323 to the engine controller 327. Such signals may also include energy absorber signals along path 324 to any number of devices for energy absorption 328, such as a retarder grid, brake systems, electric storage devices, batteries, flywheel systems, hydraulic systems, or any other known system to dissipate energy. Such signals may also include drive system propulsion signals along path 325 to the drive system components. Such signals may also include signals along path 326 to other controls 331 which may or may not be included in the example vehicle 117.

Taking the false path 339 leads to decision block 340, where it is determined if EEL is already present. Following the true path 341 leads to the operation calculation block 342 where adjustment for decreasing EEL is derived. Signal path 343 leads to operation calculation block 344 for adjustment of drive system EEL commands, if necessary. The resulting command signals are sent along path 345 to path 339, from which any number of resulting signals may be delivered. Such resulting signals may include engine signals along path 323 to the engine controller 327, energy absorber signals along path 324 to any number of devices for energy absorption 328, of which some are listed in 330 as example, drive system propulsion signals along path 325 to the drive system components, and signals along path 326 to other controls 331.

Taking the false path 346 leads to operation block 347. Operation block 347 produces signals and parameters for zero EEL values, which take signal path 348 to path 339, from which any number of resulting signals may be delivered. Such resulting signals may include engine signals along path 323 to the engine controller 327, energy absorber signals along path 324 to any number of devices for energy absorption 328, of which some are listed in 330 as example, drive system propulsion signals along path 325 to the drive system components, and signals along path 326 to other controls 331.

Figure 6:
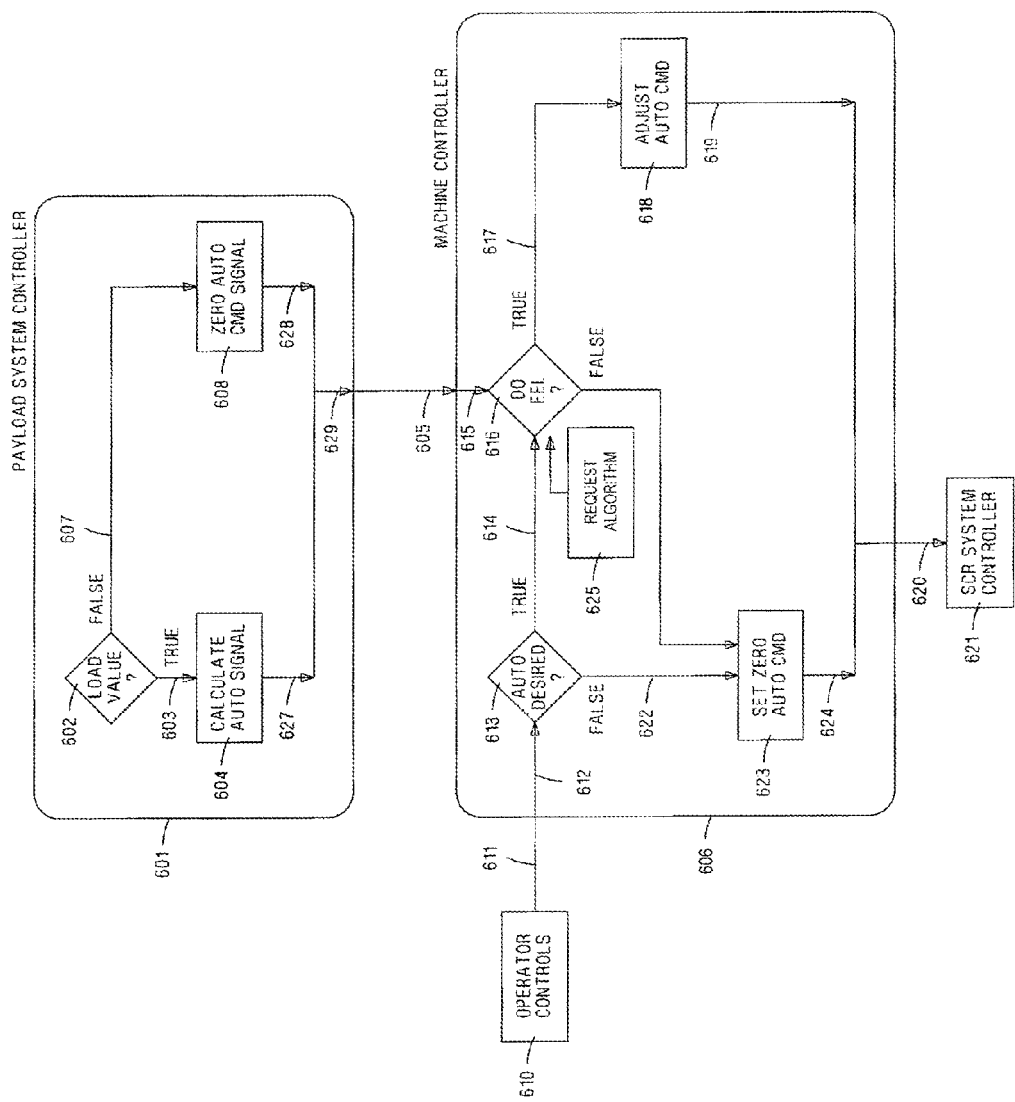
FIG. 6 is a flow diagram of a haul vehicle logic decision tree according to one embodiment.

FIG. 6 is a flow diagram of a haul vehicle logic decision tree according to another embodiment that manages the heat delivered to the SCR system. FIG. 6 includes a payload system haulage controller 601. Payload system haulage controller 601 may determine the vehicle payload condition in logic decision block 602. Payload system haulage controller 601 may include a target payload value. Reaching the target payload value may produce a signal indicating EEL is desired. The target payload value may be less than the desired or final payload for the vehicle, such that the payload system haulage controller 601 may produce the EEL signal before the desired or final payload is reached. In this way, the system may anticipate the future need for EEL. The EEL signal may be passed along path 605 to the machine controller 606. Taking false path 607 leads to operation block 608, where one or more signals for zero EEL are determined. Such zero EEL signals take signal path 628 to signal path 629 to signal path 605, which leads to the machine controller 606.

FIG. 6 may include operator controls 610, which may produce one or more signals for operator initiated EEL, regardless of other vehicle conditions, such as payload amount. Additionally or alternatively, EEL signals may be initiated at non-vehicle mounted devices and transmitted to the vehicle through any known transmission method, such as wireless transmission. The signals may proceed along signal path 611 to the machine controller 606, which in turn takes the signal path 612 to decision block 613. Decision block 613 determines if automatic command of EEL is desired. True signal path 614 leads to decision block 616, which also receives one or more signals from the payload machine controller 601 through signal path 605 to signal path 615. A desire for automatic command from decision block 613 to decision block 616 may operate as an operator override request for EEL.

Decision block 616 determines if EEL is necessary and sends true results on signal path 617 to operation block 618. Decision block 616 may request an appropriate algorithm from block 625 in order to determine if EEL is required based on various vehicle parameters, such as for example fuel burn rate or engine load. The algorithm may vary depending on the operating condition of the vehicle. Operation block 618 determines a set of EEL parameters to achieve the desired EEL. The set of EEL parameters is delivered along signal path 619 to signal path 620, which leads to the SCR system controller 621.

Taking false path 622 from decision block 613 leads to operation block 623. Operation block 623 generates parameters for zero EEL amounts, which are passed along signal path 624 to signal path 620 to the SCR system controller 621.

Calculation decision block 616 may determine a need for EEL other than providing heat to the SCR or to improve engine responsiveness. For example, EEL may be needed for a period of time to clean the SCR components or ensure the SCR components remain clean. Many variations are possible for when the EEL clean cycle signal, for example, has been determined and what parameters may exist for a clean cycle upon which EEL generation should occur.

Figure 7:
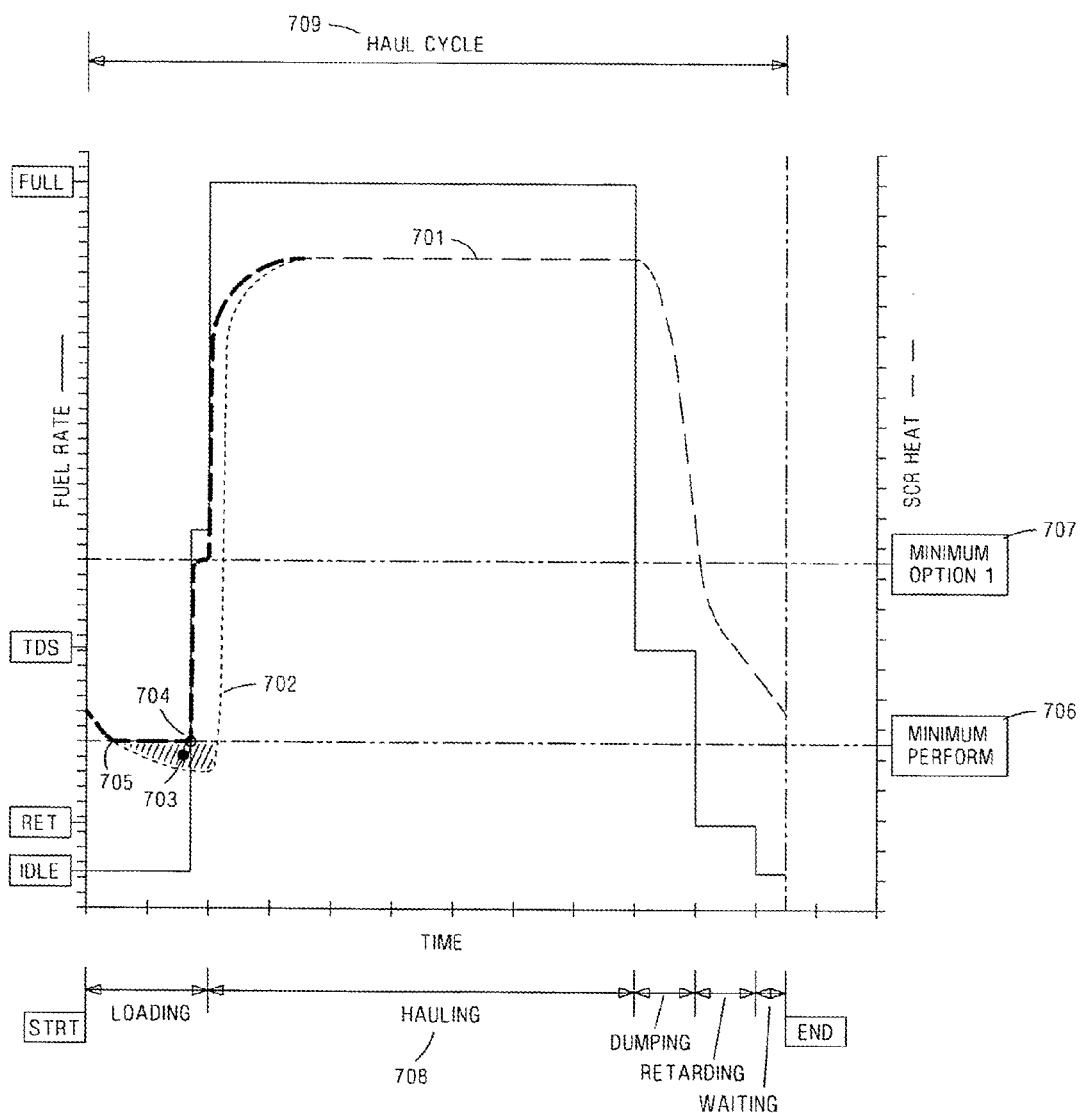
FIG. 7 is a graphical representation of improved haul cycle fuel rate and SCR heat according to one embodiment.

FIG. 7 is a graphical representation of improved haul cycle fuel rate and SCR heat curves according to one embodiment. FIG. 7 may include an improved resultant heat to the SCR when compared to FIG. 4. The segments of haul cycle 709 may be the same as the segments of haul cycle 425. The improved results of existing curve path 702 show that region 703, which is same as region 414 described earlier, is avoided with the new curve 701. Point 705 demonstrates where EEL signals were generated and EEL action was taken to maintain the gas temperature or heat to the SCR at or above the minimum performance level 706. Such action may ensure that the SCR operates efficiently or adequately. Point 704 demonstrates the beginning of additional EEL to reach the minimum option 1 level 707, such that the minimum option 1 level 707 is reached for the beginning portion of the hauling region 708 of the example haul cycle 709. Such an addition of EEL may be initiated in anticipation of the need for greater engine responsiveness during hauling region 708. Similar anticipation of EEL may be initiated to ensure adequate heat to the SCR to remain above minimum performance level 706. The EEL initiated at point 704 may be larger or smaller in value than the EEL initiated at point 705.

Various methods may be used to anticipate the need for EEL. For example, the payload of the vehicle in relation to a target payload value, the distance traveled during a haul cycle such that the location of the vehicle in the haul cycle can be ascertained, the time spent in a haul cycle such that the location of the vehicle in the haul cycle can be ascertained, the upcoming segments in a haul cycle when the segments of the haul cycle are known beforehand, the energy output of the engine over time (engine output load multiplied by time) such that the location of the vehicle in the haul cycle can be ascertained, the physical location of the vehicle as determined by global positioning systems, and any other methods that may be used to determine the location of a vehicle relative to a haul cycle. Any of the aforementioned methods, or a combination thereof, may be used to anticipate the need for EEL, regardless of what the goal of the EEL may be, such as adequate heat to the SCR or greater engine responsiveness.

Figure 8:
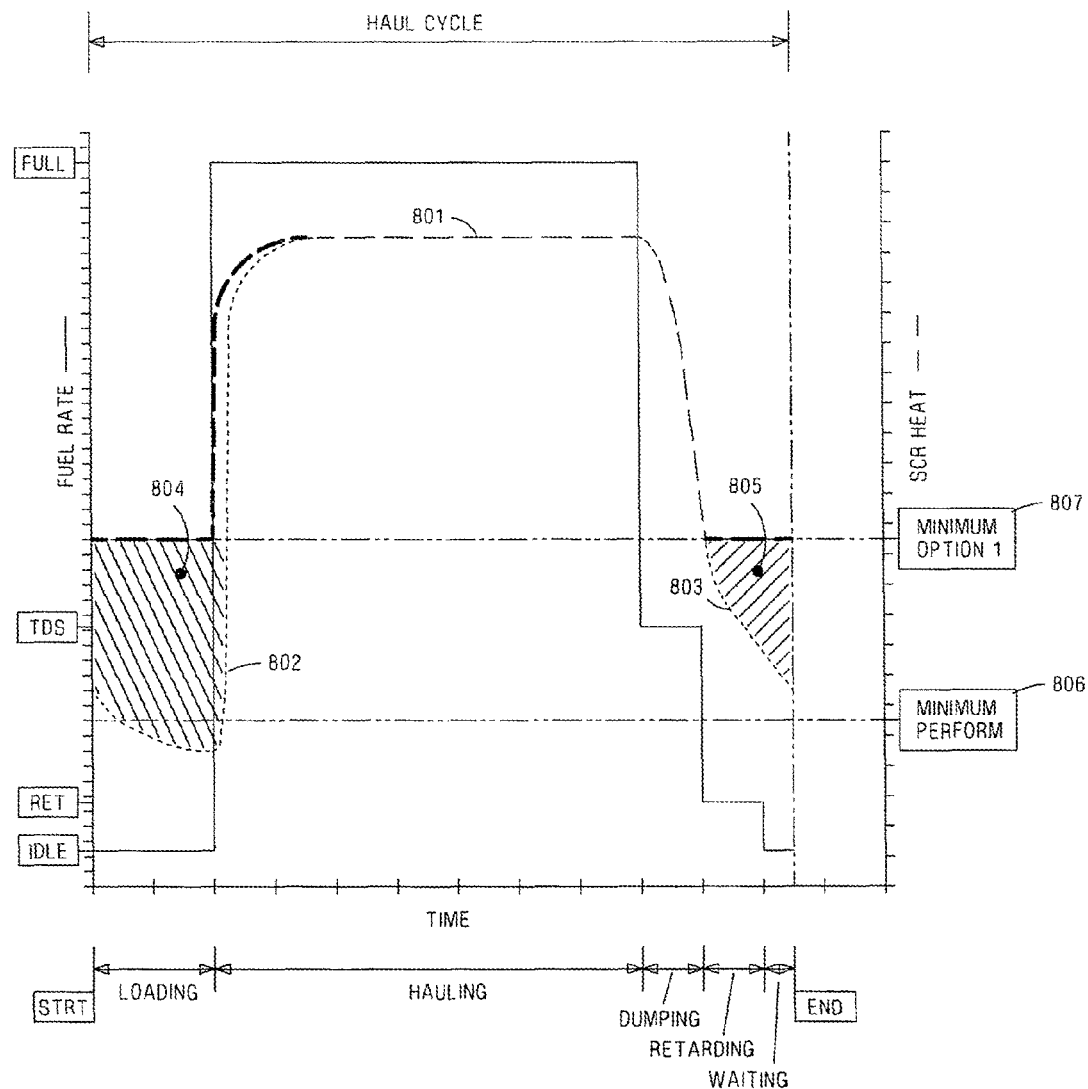
FIG. 8 is a graphical representation of another improved haul cycle fuel rate and SCR heat according to one embodiment.

FIG. 8 is a graphical representation of another improved haul cycle fuel rate and SCR heat curve according to another embodiment. FIG. 8 may include an improved resultant heat to the SCR when compared to FIG. 4. The segments of the haul cycle in FIG. 8 may be the same as the segments of haul cycle 425. FIG. 8 may include improved curve path 802 and curve path 803, shown with region 804, which is same as region 416 described earlier, and shown with region 805, which is same as region 415. Regions 804 and 805 may be avoided with the new curve 801. The resultant curve shows the EEL is adjusted to maintain the heat at the minimum option 1 level 807. Accordingly, the engine may provide greater responsiveness and may not act sluggishly. FIG. 8 may represent an application with the desired effect for keeping heat to the SCR at this minimal option 1 level 807 for continuous, immediate responsive engine performance. FIG. 8 may also represent an application where SCR system performance is maintained at a desired level of minimal reaction performance, while also avoiding low response region 804 and low response region 805.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

The invention claimed is:

1. A method for providing adequate heat to a selective catalyst reduction system located in a vehicle with an engine and a selective catalyst reducer (SCR), the method comprising:
sensing a temperature indicative of the gas temperature at an inlet of the SCR;
determining whether the gas temperature at the inlet of the SCR is at a first predetermined minimum temperature;
determining the engine load required for current vehicle operation;
calculating a first increased engine load required to increase the gas temperature at the inlet of the SCR to at least the first predetermined minimum temperature;
calculating a first excess engine load by comparing the engine load required for current vehicle operation to the first increased engine load;
adjusting the engine load to the first increased engine load;
discarding the first excess engine load through a power absorption device;
determining a haul cycle of the vehicle, wherein the haul cycle includes a plurality of segments;
anticipating a future need for a raised engine load based on the upcoming segments in the haul cycle, wherein at least one segment of the haul cycle calls for the raised engine load, wherein the raised engine load occurs above a second predetermined temperature of the gas at the inlet of the SCR;
calculating a second increased engine load required to increase the gas temperature at the inlet of the SCR to at least the second predetermined temperature;
calculating a second excess engine load by comparing the first increased engine load to the second increased engine load;
adjusting the engine load to the second increased engine load before the vehicle reaches the haul cycle segment that calls for the raised engine load;
discarding the second excess engine load through the power absorption device.

2. The method of claim 1, wherein an odometer reading of the vehicle is used to anticipate a future need for a raised engine load.

3. The method of claim 1, wherein a time period that the vehicle has been in the haul cycle is used to anticipate a future need for a raised engine load.

4. The method of claim 1, wherein an energy output of the engine over time is used to anticipate a future need for a raised engine load.

5. The method of claim 1, wherein the power absorption device is selected from a group consisting of brakes, electronic energy storage devices, batteries, flywheels, hydraulic systems, retarding grids, and combinations of the foregoing.

6. The method of claim 1, wherein the first predetermined temperature relates to a minimum gas temperature required for SCR performance.

7. The method of claim 1, wherein the second predetermined temperature relates to a minimum gas temperature indicative of improved engine responsiveness.

8. A method for providing adequate heat to a selective catalyst reduction system located in a vehicle with an engine and a selective catalyst reducer (SCR), the method comprising:
sensing a temperature indicative of the gas temperature at an inlet of the SCR;
determining whether the gas temperature at the inlet of the SCR is at a first predetermined minimum temperature;
determining the engine load required for current vehicle operation;
calculating a first increased engine load required to increase the gas temperature at the inlet of the SCR to at least the first predetermined minimum temperature;
calculating a first excess engine load by comparing the engine load required for current vehicle operation to the first increased engine load;
adjusting the engine load to the first increased engine load;
discarding the first excess engine load through a power absorption device;
determining a payload located in the vehicle;
anticipating a future need for a raised engine load based on the payload located in the vehicle, wherein the raised engine load is needed when the payload located in the vehicle reaches a predetermined payload level, wherein the raised engine load occurs above a second predetermined temperature of the gas at the inlet of the SCR;
calculating a second increased engine load required to increase the gas temperature at the inlet of the SCR to at least the second predetermined temperature;

calculating a second excess engine load by comparing the first increased engine load to the second increased engine load;

adjusting the engine load to the second increased engine load before the payload located in the vehicle reaches the predetermined payload level;

discarding the second excess engine load through the power absorption device.

9. The method of claim 8, wherein the power absorption device is selected from a group consisting of brakes, electronic energy storage devices, batteries, flywheels, hydraulic systems, retarding grids, and combinations of the foregoing.

10. The method of claim 8, wherein the first predetermined temperature relates to a minimum gas temperature required for SCR performance.

11. A method for providing adequate heat to a selective catalyst reduction system located in a vehicle with an engine and a selective catalyst reducer (SCR), the method comprising:

sensing a temperature indicative of the gas temperature at an inlet of the SCR;

determining whether the gas temperature at the inlet of the SCR is at a first predetermined minimum temperature;

determining the engine load required for current vehicle operation;

calculating a first increased engine load required to increase the gas temperature at the inlet of the SCR to at least the first predetermined minimum temperature;

calculating a first excess engine load by comparing the engine load required for current vehicle operation to the first increased engine load;

adjusting the engine load to the first increased engine load;

discarding the first excess engine load through a power absorption device;

determining whether the engine is operating at the first increased engine load;

determining whether the gas temperature at the inlet of the SCR is above the first predetermined minimum temperature;

calculating a second increased engine load required to decrease the gas temperature at the inlet of the SCR to the first predetermined minimum temperature, wherein the second increased engine load is lower than the first increased engine load;

calculating a second excess engine load by comparing the first increased engine load to the second increased engine load;

adjusting the engine load to the second increased engine load;

discarding the second excess engine load through the power absorption device.

12. The method of claim 11, wherein the power absorption device is selected from a group consisting of brakes, electronic energy storage devices, batteries, flywheels, hydraulic systems, retarding grids, and combinations of the foregoing.

13. The method of claim 11, wherein the first predetermined temperature relates to a minimum gas temperature required for SCR performance.

14. A method for maintaining engine load and for providing adequate heat to a selective catalyst reduction system located in a vehicle with an engine and a selective catalyst reducer (SCR), the method comprising:

determining a haul cycle of the vehicle, wherein the haul cycle includes a plurality of segments;

anticipating a future need for an increased engine load based on the upcoming segments in the haul cycle, wherein at least one segment of the haul cycle will result in a gas temperature at the inlet of the SCR falling below a predetermined minimum temperature;

calculating an increased engine load required to increase the gas temperature at the inlet of the SCR to at least the predetermined minimum temperature;

determining the engine load required for current vehicle operation;

calculating an excess engine load by comparing the engine load required for current vehicle operation to the increased engine load;

adjusting the engine load to the increased engine load before the vehicle reaches the haul cycle segment that will result in a gas temperature at the inlet of the SCR falling below the predetermined minimum temperature;

discarding the excess engine load through a power absorption device.

15. The method of claim 14, wherein the power absorption device is selected from a group consisting of brakes, electronic energy storage devices, batteries, flywheels, hydraulic systems, retarding grids, and combinations of the foregoing.

16. The method of claim 14, wherein the predetermined temperature relates to a minimum gas temperature required for SCR performance.

17. The method of claim 14, wherein the predetermined temperature relates to a minimum gas temperature indicative of improved engine responsiveness.

\* \* \* \* \*